United States Patent
Morita et al.

(10) Patent No.: US 8,005,356 B2
(45) Date of Patent: Aug. 23, 2011

(54) VIDEO TRANSMISSION SYSTEM OF A RING NETWORK

(75) Inventors: Takaaki Morita, Kawasaki (JP); Kazunori Nakamura, Kawasaki (JP)

(73) Assignee: Media Global Links Co., Ltd., Kawasaki-shi (JP)

( * ) Notice: Subject to any disclaimer, the term of this patent is extended or adjusted under 35 U.S.C. 154(b) by 672 days.

(21) Appl. No.: 12/069,504

(22) Filed: Feb. 11, 2008

(65) Prior Publication Data

US 2008/0193129 A1 Aug. 14, 2008

Related U.S. Application Data

(60) Provisional application No. 60/901,058, filed on Feb. 13, 2007.

(51) Int. Cl.
*H04B 10/00* (2006.01)
*H04B 10/20* (2006.01)
*H04J 14/02* (2006.01)

(52) U.S. Cl. ............ 398/4; 398/5; 398/59; 398/82

(58) Field of Classification Search .......... 398/3, 4, 398/5, 58, 59, 82, 83
See application file for complete search history.

(56) References Cited

U.S. PATENT DOCUMENTS

| 6,775,479 | B2 * | 8/2004 | Milton et al. ............... 398/79 |
| 7,515,828 | B2 * | 4/2009 | Gumaste et al. ............ 398/83 |
| 2004/0103209 | A1 | 5/2004 | Kinoshita et al. |
| 2006/0210273 | A1 | 9/2006 | Gumaste et al. |
| 2006/0216029 | A1 * | 9/2006 | Vassilieva et al. ........... 398/83 |

FOREIGN PATENT DOCUMENTS

JP 2001-16554 1/2001

* cited by examiner

*Primary Examiner* — Dalzid Singh
(74) *Attorney, Agent, or Firm* — Day Pitney LLP

(57) ABSTRACT

It is an objective to provide a video transmission system enabling easy acquisition and addition of any video signal. According to the ring network, optical wavelength multiplexing and transmission of video signal to be utilized for this network is carried out, so that it is possible to implement an environment, in which all necessary video signals flow on the network. Consequently, by acquiring any video signal from the video signals flowing on the network, it is possible to acquire new video source, or by adding new video source to the network, it is possible to utilize the added video source by all apparatuses connected to the network.

12 Claims, 10 Drawing Sheets

VIDEO TRANSMISSION SYSTEM OF A RING NETWORK

This Nonprovisional application claims priority under 35 U.S.C. §119(e) on U.S. Provisional Application No. 60/901,058 filed on Feb. 13, 2007, the entire contents of which are hereby incorporated by reference.

BACKGROUND OF THE INVENTION

1. Field of the Invention

The present invention relates to a video transmission system of a ring network. Specifically, the present invention relates to a video transmission system for implementing a new video transmission method.

2. Description of the Related Art

Conventionally, in a video transmission system for transmitting a video signal such as HDTV (High-Definition Television) signal and SDTV (Standard-Definition Television) signal, respective video transmission apparatuses are connected in a point-to-point (P to P) configuration, thereby transmitting video. The reason for this is that high-quality video is required for broadcasting, and in terms of its purpose, it is necessary to prevent interruption and distortion of the video utilized for broadcasting. Therefore, video transmission is carried out by means of special connection line between apparatuses in order to prevent reception of other spurious signals, thereby transmitting high-quality video.

Between video transmission apparatuses connected in a point-to-point configuration, transmission paths are required based on the number of SDTV signals and HDTV signals. For example, in Unexamined Japanese Patent Application Publication No. 2001-16554, a video transmission method, which can transmit a plurality of video signals by a simple transmission path, and is flexibly adjustable to vary the number of signals to be transmitted. In the Unexamined Japanese Patent Application Publication No. 2001-16554, a control signal, including information on the type of signal to be multiplexed, and on number of signals to be multiplexed, is generated in the transmitter side, and the control signal and video signal are multiplexed and are transmitted to the transmission path, so that receiver side can control the type and number of video signals, to be demultiplexed, based on the control signal.

Further, a method, in which by means of optical wavelength multiplexing, a plurality of signals are multiplexed, and are transmitted to a simple transmission path, has been used.

In the conventional technology, a video signal is transmitted by means of a simple transmission path connected in a point-to-point configuration. In the system, for example as shown in FIG. 10, in cases where a video transmission apparatus a utilizes video signal (video source), transmitted via another transmission path x, which is not connected to the apparatus itself, it is necessary that the video signal is once acquired by a video transmission apparatus b, which is connected to another transmission path x, and is re-transmitted to a transmission path y, which is connected to the video transmission apparatus a. Therefore, when acquiring the video source transmitted via the transmission path x, complex processes are required, or the acquisition of video source is impossible depending on configuration of the transmission path.

SUMMARY OF THE INVENTION

It is an objective of the present invention to provide a video transmission system for easily implementing acquisition or addition of any video signal.

In order to solve the above deficiencies, the present invention provides a video transmission system of ring network, comprising a ring redundant network, which is for carrying out optical wavelength multiplexing of at least one video signal, utilizable in the system, and transmission of the multiplexed signal, an acquisition unit for multiplexed signal, which acquires the multiplexed signal in the ring redundant network, an output unit for first signal, which is capable of outputting any first video signal, demultiplexed from the acquired multiplexed signal, to external from the ring redundant network, an input receiving unit for second signal, which receives an input of any second video signal, to be included in the multiplexed signal in the ring redundant network, external from the ring redundant network, and an output unit for multiplexed signal, which is capable of multiplexing of the second video signal, which has been inputted, and of outputting the multiplexed signal to the ring redundant network.

According to this ring network, optical wavelength multiplexing and transmission of video signal to be utilized for this network is carried out, so that it is possible to implement an environment, in which all necessary video signals flow on the network. Consequently, by acquiring any video signal from the video signals flowing on the network, it is possible to acquire new video source, or by adding a new video source to the network, it is possible to utilize the added video source by all apparatuses connected to the network.

For example, the ring network is configured by a plurality of optical wavelength multiplexing apparatuses, and transmission of the video signals carried out between a plurality of video transmission apparatuses, which are respectively adjacent to the optical wavelength multiplexing apparatuses.

In addition, as another aspect of the present invention, the video transmission system of ring network, comprising the control apparatus, which carries out integrated control of the respective outputs on the basis of wavelength of signal, is provided. The control apparatus carries out the control, for example, by means of GMPLS (Generalized Multi-Protocol Label Switching). The control apparatus can control to acquire (Drop) any video signal from the network, to which the multiplexed signal is transmitted.

In addition, as another aspect of the present invention, the video transmission system of ring network, wherein the video transmission apparatus comprises a buffer unit, which buffers the video signal, inputted from the respective redundant systems, a detection unit for failure, which detects a failure in an active system of the systems, and an output switching unit, which carries out switching of output in order to output the video signal to another external video apparatus by means of the video signal, which has been inputted from the other system and buffered, in cases where the failure is detected, is provided. According to this configuration, it is possible to carry out switching of network system without instantaneous interruption even when failure occurs.

According to the present invention, transmission of video signal to be utilized for the ring network is carried out, so that it is possible to implement an environment, in which all necessary video signals flow on the network. Consequently, it is possible to acquire any necessary video signal from the network (Drop), or by adding new video signal to the network (Add), it is possible to utilize the new video signal by all apparatuses connected to the network.

DETAILED DESCRIPTION OF THE PREFERRED EMBODIMENTS

Embodiments of the present invention will be described hereinbelow with reference to the drawings. The present invention is not to be limited to the above embodiments and able to be embodied in various forms without departing from the scope thereof.

A first embodiment relates to the video transmission system of the ring network comprising the ring redundant network. The video signal to be necessary is transmitted on the ring network, and only necessary video is acquired (Drop) from the network, or new video signal is added (Add) to the network.

Figure 1:
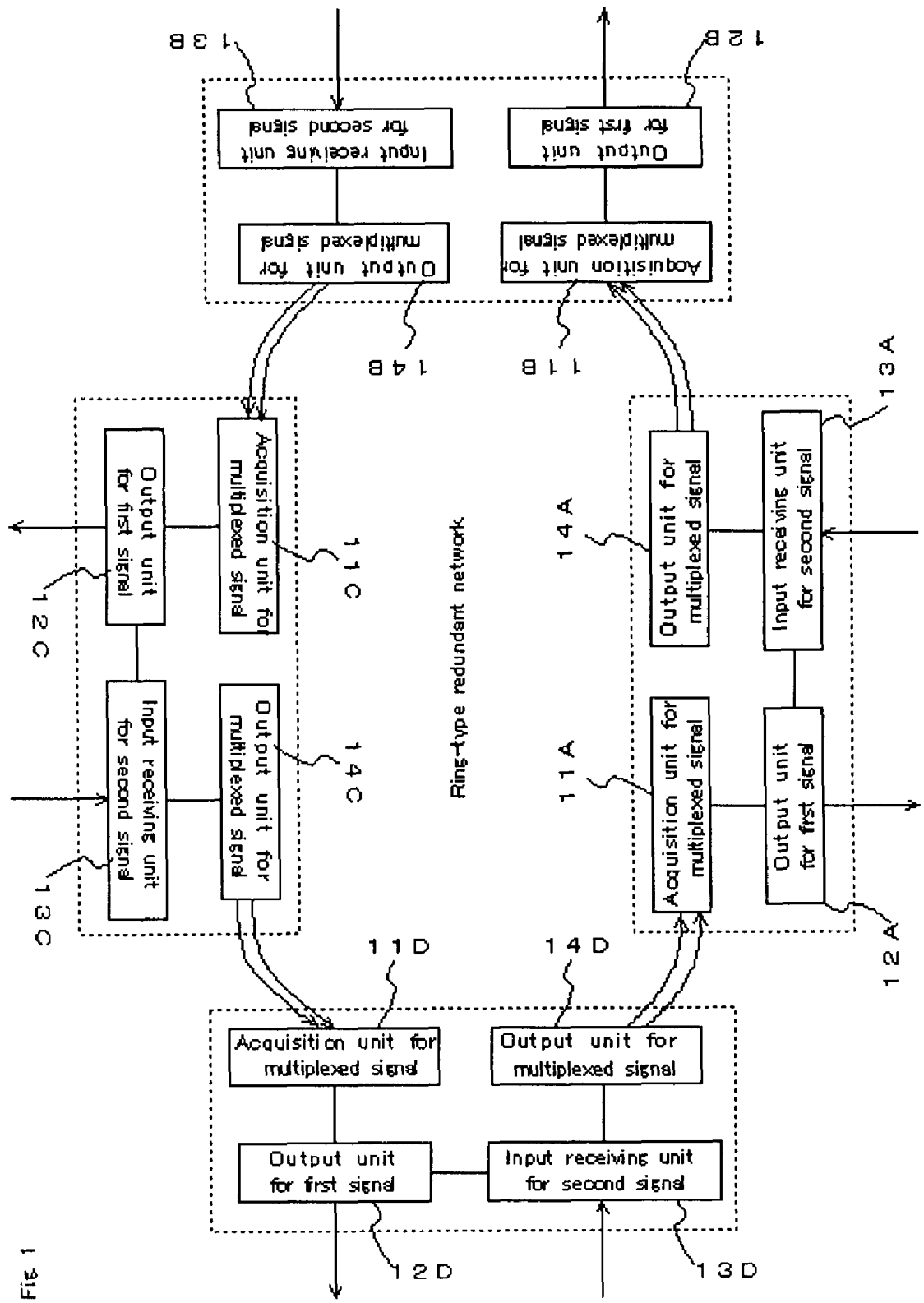
FIG. 1 is a functional block diagram of a first embodiment.

FIG. 1 is a functional block diagram of a first embodiment. As show in FIG. 1, a video transmission system of ring network of the first embodiment comprises a 'ring redundant network', an 'acquisition unit for multiplexed signal' (11A-D), an 'output unit for first signal' (12A-D), an 'input receiving unit for second signal' (13 A-D), and an 'output unit for multiplexed signal' (14 A-D). As shown in FIG. 1, there are a plurality of the 'acquisition units for multiplexed signal' (11A-D), the 'output units for first signal' (12A-D), the 'input receiving units for second signal' (13 A-D), and the 'output units for multiplexed signal' (14 A-D) in the ring redundant network.

The 'ring redundant network' is for implementing optical wavelength multiplexing of at least one video signal, utilizable in the system, and transmission of the multiplexed signal. The term 'system' corresponds to a video transmission system in the present invention. The ring redundant network is physically connected to optical fiber cable, and video signal is multiplexed by optical signal and is transmitted. In this specification, there are cases where the ring network is simply referred to as a 'network'. Further, in this specification, there are cases where acquisition of signal from the network to external from the network is described as 'Drop', and addition of signal from the exterior of the network to the network is described as 'Add'.

The ring redundant network is for carrying out transmission of the multiplexed signal, generated by optical wavelength multiplexing of at least one video signal. It is preferable that all video signals needed for the system are multiplexed by optical wavelength multiplexing, and are transmitted. Examples of the optical wavelength multiplexing include DWDM (Dense WDM) for multiplexing more than 16 waves, CWDM (Coarse WDM) for multiplexing around 8 waves, and WWDM (Wide WDM) for multiplexing around 4 waves. Note that in this specification, the above apparatuses for optical wavelength multiplexing or wavelength separation are described as the optical wavelength multiplexing apparatus (WDM (Wavelength Division Multiplexing) apparatus). It is preferable that the ring network is a redundant network including a plurality of optical transmission paths as shown in FIG. 1. Further, as shown in FIG. 1, the identical multiplexed signal may be transmitted in the same direction. Alternatively, although it is not shown in FIG. 1, the identical multiplexed signal may be transmitted in different directions. According to the above configuration, even if the failure occurs on a certain optical transmission path, the multiplexed signal in the other transmission path is utilized, thereby enabling transmission of video signal to video transmission apparatus etc., in which real-time processing is strongly required, without interruption. Note that examples of the video signal include HDTV signal and SDTV signal.

Subsequently, a configuration, in which output (Drop) and addition (Add) with this ring redundant network are carried out, will be described.

The 'acquisition unit for multiplexed signal' (11A-D) acquires the multiplexed signal in the ring redundant network. When acquiring the multiplexed signal, conversion of optical signal to electrical signal may be carried out. By converting the optical signal to the electrical signal, as in the after-mentioned embodiment, it is possible that many video signals (video source) are included in one wavelength. This will be concretely described, hereinafter.

The 'output unit for first signal' (12A-D) is capable of outputting any first video signal, demultiplexed from the acquired multiplexed signal, to external from the ring redundant network. The terms 'to external from the ring redundant network' mean external from transmission path of the multiplexed signal, and specifically, a destination of output is the video transmission apparatus. In the output unit for first signal, output of any first video signal is possible. For example, a fixed setting in order to demultiplex the signal of a specific carrier may be carried out, thereby demultiplexing the signal of the specific carrier according to the setting. Alternatively, as in after-mentioned embodiment, a configuration may be made so as to demultiplex and output a signal of a specific carrier based on an instruction signal from another control apparatus. The first video signal is outputted from the output unit for first signal to the video transmission apparatus, and in the subsequent process, it is transmitted, for example, to the external video apparatus in the broadcasting station. As described above, all video signals (video sources) are preferably included in the multiplexed signal, so that it is possible to appropriately extract necessary video signal from the network, and to output the video signal to external from the network (Drop). Note that in this specification, the video signal outputted (Drop) to external from the network is described as the first video signal.

The 'input receiving unit for second signal' (13A-D) receives an input of any second video signal, external from said ring redundant network, to be included in the multiplexed signal in said ring redundant network. Specifically, the second video signal is inputted from the video transmission apparatus. This inputted second video signal is multiplexed by a predetermined an optical wavelength, and is included in the multiplexed signal to be transmitted through the network, thereby enabling the addition of new video source. Note that in this specification, the video signal added (Add) to the network is described as the second video signal.

The 'output unit for multiplexed signal' (14A-D) is capable of multiplexing of the second video signal, which has been inputted, and of outputting the multiplexed signal to the ring redundant network. In the output unit for multiplexed signal, electrical signal may be converted to an optical signal. For example, the output unit for multiplexed signal 14A can multiplex the second video signal with the multiplexed signals outputted by the other output units for multiplexed signal 14B and 14C, and can output them to the network. Note that if the second video signal is not inputted, the output unit for multiplexed signal 14A can output the multiplexed signal, acquired by the acquisition unit for multiplexed signal 11A, as a multiplexed signal without variation.

Figure 2:
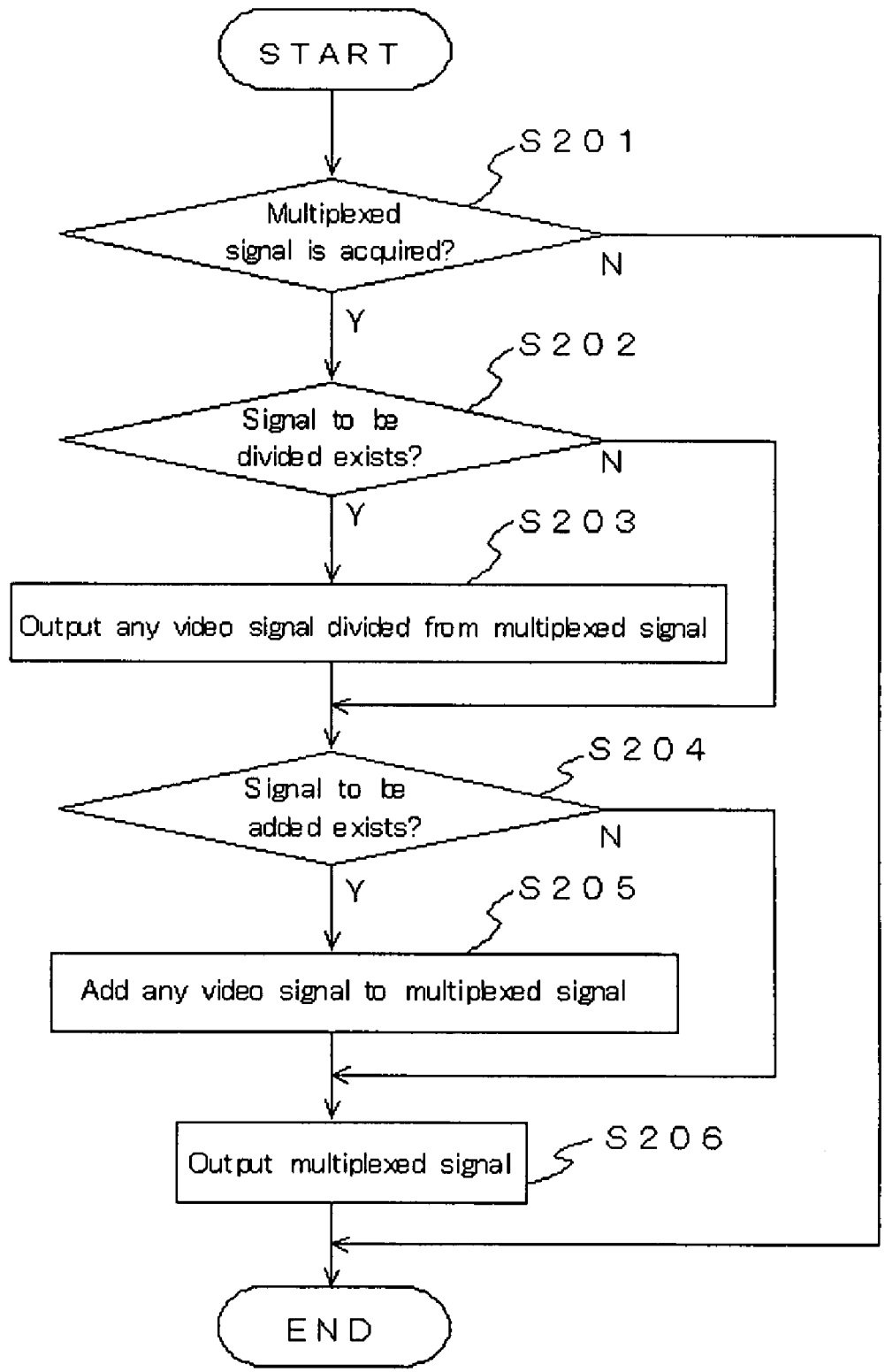
FIG. 2 is a flow chart of the first embodiment.

FIG. 2 is a flow chart showing a processing in the system of the first embodiment. At the outset, the multiplexed signal is acquired from the network (S201). Subsequently, it is determined whether the acquired multiplexed signal includes a signal to be demultiplexed (S202). If the signal to be demultiplexed is included, the multiplexed signal is demultiplexed, and any first video signal is outputted to external from the network (S203). If it is determined in the S202 that the signal to be demultiplexed is not included, the S203 is not carried out. After that, it is determined whether output of the second video signal is received (S204). If the second signal to be included in the network exists, the second video signal is added to the multiplexed signal (S205). Meanwhile, if the second video signal does not exist, S205 is not carried out. The multiplexed signal is outputted to the network (S206). The above process is carried out, for example, by a plurality of optical wavelength multiplexing apparatuses, so that it is possible to transmit all of the video sources on the network, thereby enabling drop of any video signal from the network (Drop), and addition to the network (Add).

Figure 3:
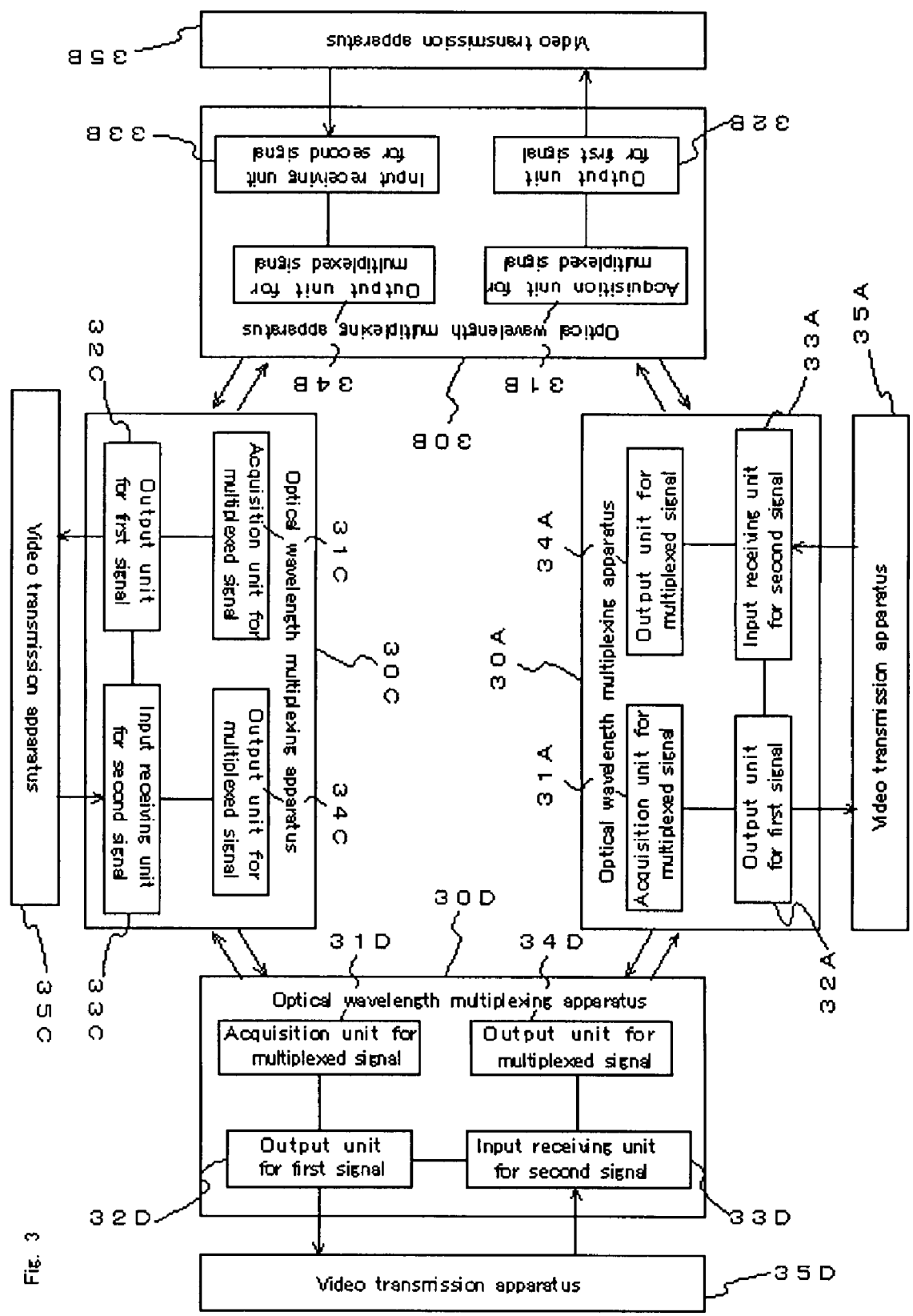
FIG. 3 is a diagram showing a configuration of the first embodiment.

FIG. 3 is a diagram showing a configuration of the first embodiment. As shown in FIG. 3, specifically, this system is a video transmission system of ring network, comprising a plurality of optical wavelength multiplexing apparatuses (30A-D), configuring a ring network, and a plurality of video transmission apparatuses (35A-D), which are respectively adjacent to the optical wavelength multiplexing apparatuses. Additionally, the optical wavelength multiplexing apparatuses (30A-D) comprises an acquisition unit for multiplexed signal (31A-D), an output unit for first signal (32A-D), an input receiving unit for second signal (33 A-D), and an output unit for multiplexed signal (34 A-D).

Figure 4:
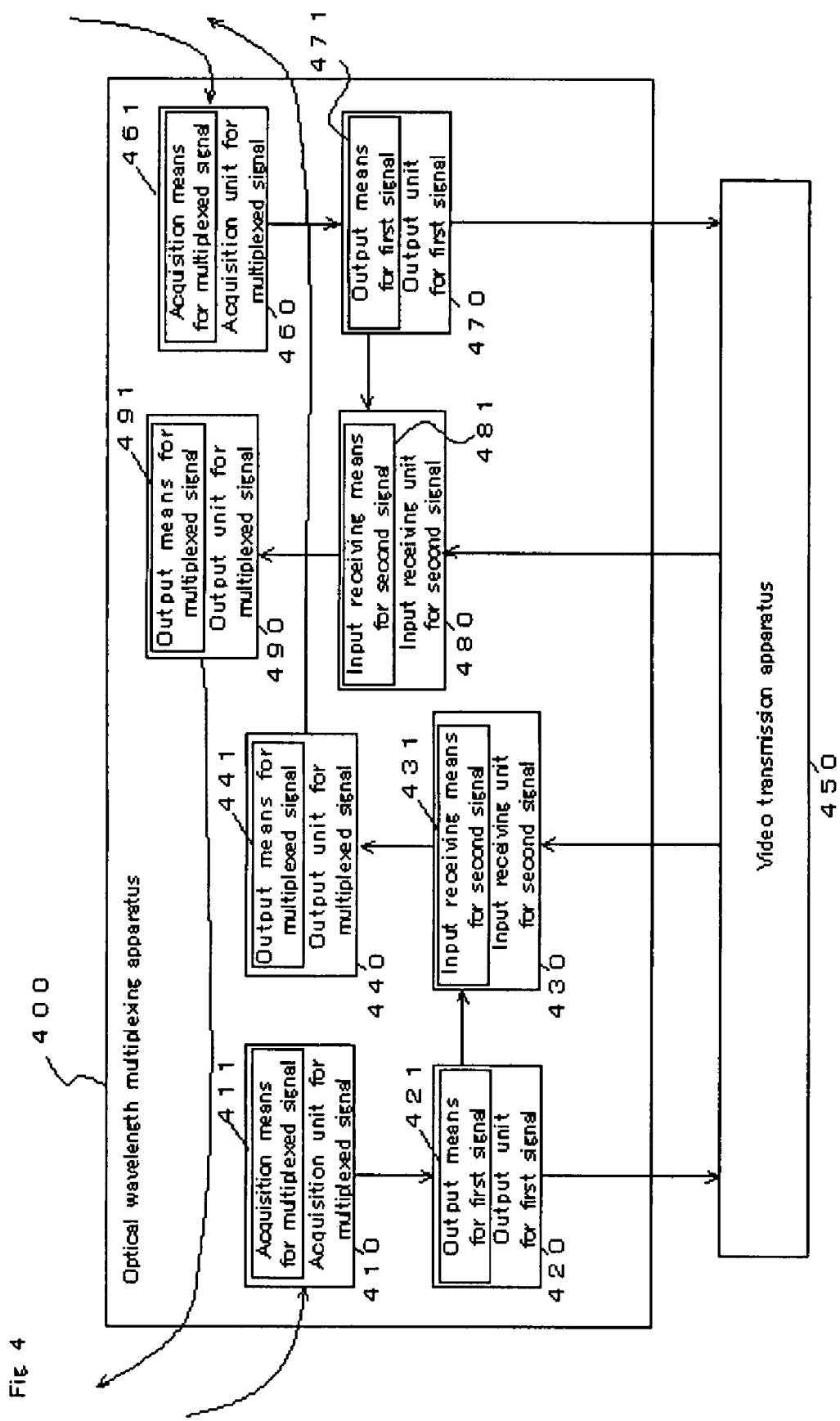
FIG. 4 is a diagram showing a configuration of an optical wavelength multiplexing apparatus of the first embodiment.

FIG. 4 is a functional block diagram partially showing a pair of the optical wavelength multiplexing apparatus and the video transmission apparatus. As shown in FIG. 4, the acquisition units for multiplexed signal 410 and 460 of the optical wavelength multiplexing apparatus 400 comprise 'acquisition means for multiplexed signal' 411 and 416, which acquire multiplexed signals, outputted from another optical wavelength multiplexing apparatus, the output units for first signal 420 and 470 comprise 'output means for first signal' 421 and 471, which are capable of outputting the first video signal to the adjacent video transmission apparatus, which is external from the ring redundant network, and the input receiving units for second signal 430 and 480 comprise 'input receiving means for second signal' 431 and 481, which receive an input of the second video signal from the adjacent video transmission apparatus, which is external from the ring redundant network, and the output units for multiplexed signal 440 and 490 comprise 'output means for multiplexed signal' 441 and 491, which are capable of multiplexing of the second video signal, and of outputting the multiplexed signal to another optical wavelength multiplexing apparatus, different from the optical wavelength multiplexing apparatus, which has acquired the multiplexed signal.

The multiplexed signal acquired by the acquisition units for multiplexed signal 410 is transmitted to the output units for first signal 420. The output unit for first signal 420 carries out demultiplexing and output (Drop), and transmits the multiplexed signal to the input receiving unit for second signal 430. Note that in the output units for first signal 420, the second video signal, inputted in the input receiving unit for second signal 430, may be discarded due to the fact that it has made a circuit of the ring. The input receiving unit for second signal 430 receives input of the second video signal, and transmits the multiplexed signal and the second video signal to the output unit for multiplexed signal 440. The output unit for multiplexed signal 440 outputs the second video signal included in the multiplexed signal to the network.

The video transmission apparatus 450 carries out input/output of signal with the adjacent optical wavelength multiplexing apparatus. For example, the input/output of signal with the adjacent optical wavelength multiplexing apparatus is carried out by means of optical signal or an electric signal. The video transmission apparatus 450 can receive any video signal (video source), transmitted through the ring redundant network, via active or stand-by system. Further, in cases where the video signal is outputted from the video transmission apparatus 450 to the other external video apparatus, it is possible to select any one of the active or stand-by system, and to carry out output. Note that although the video transmission apparatus and the optical wavelength multiplexing apparatus have been described separately in the above description, the respective configurations may be implemented by one apparatus, in which the video transmission apparatus and the optical wavelength multiplexing apparatus are integrated.

Note that the respective units of the present invention can be configured by hardware, software, or both hardware and software. For example, in the case of using a microprocessor, the respective units are implemented by the hardware configured by a microprocessor, a memory, a bus, an interface, and various types of LSI etc., and by the software operable on the hardware. Strictly speaking, by sequentially carrying out programs on the memory, the data on the memory and the data inputted via the interface are processed, stored, and outputted etc., thereby implementing functions of the respective units. (Hereinafter, the same applies thorough the entire specification).

According to the video transmission system of ring network of the first embodiment, optical wavelength multiplexing and redundant transmission on the network of the video signal to be video source is carried out, thereby acquiring necessary video signal by one or a plurality of video transmission apparatuses. Therefore, in the conventional point-to-point system, the video signal is transmitted to only one video transmission apparatus. Meanwhile, according to the configuration of the first embodiment, the identical video signal can be transmitted to a plurality of video transmission apparatuses. Additionally, all video sources (video signals) preferably flow on the network, so that it is possible to appropriately extract the necessary video signal in the video transmission apparatus.

A second embodiment relates to the video transmission system of ring network as described in the first embodiment, further comprising a control apparatus, which carries out control so that the first video signal is demultiplexed from the multiplexed signal, and is outputted to external from the network, and input of the second video signal is received, and is outputted as multiplexed signal. According to the control by the control unit, for example, date/time dependent switching of the output video signal (in this specification, it is described as 'switching of schedule'), in which, for example, switching of video signal to be outputted to video transmission apparatus is carried out at a predetermined time, is possible.

Figure 5:
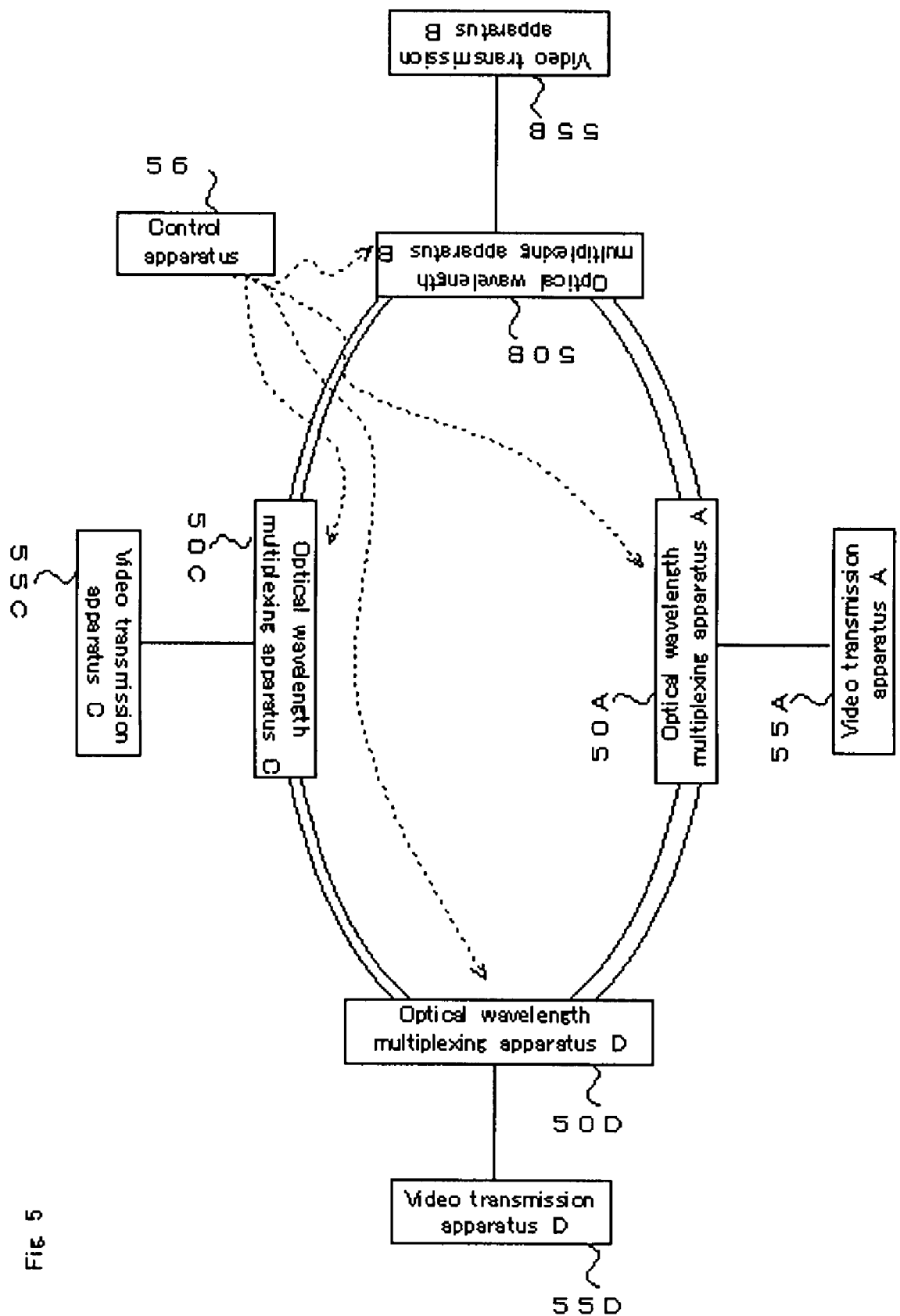
FIG. 5 is a block diagram of a second embodiment.

FIG. 5 is a block diagram of the video transmission system of the ring network of the second embodiment. Note that in the second embodiment, the description will be made based on the configuration, comprising the optical wavelength multiplexing and the video transmission apparatus as shown in FIG. 3. In FIG. 5, a 'control apparatus' 56 is further disclosed.

The output unit for first signal (including the output means for first signal) and the output unit for multiplexed signal (including output means for multiplexed signal) carry out the respective outputs, in which the signal is identifiable on the basis of wavelength of the carrier. As to the signal, multiplexed by optical wavelength multiplexing, wavelength of the respective signals is different, so that it is possible to carry out identification of the respective signals on the basis of wavelength of the carrier.

The 'control apparatus' 56 carries out integrated control of the respective outputs on the basis of wavelength of the signal. The term 'respective outputs' means output to the video transmission apparatus by the output unit for first signal (Drop), and output of the multiplexed signal to the network by the output unit for multiplexed signal. The control of these outputs is carried out on the basis of wavelength of signal. For example, the control is carried out by means of GMPLS (Generalized Multi-Protocol Label Switching). In GMPLS, optical wavelength, time slot, and port number of apparatus etc. are defined as a label, and route setting for operation of label switch is carried out by means of shared protocol. In GMPLS, the route setting of optical signal can be carried out based on optical wavelength of the signal. Therefore, by means of GMPLS, according to the wavelength of the optical signal, it is possible to drop video signal of a predetermined wavelength, or to add video signal multiplexed by means of a predetermined wavelength.

Figure 6:
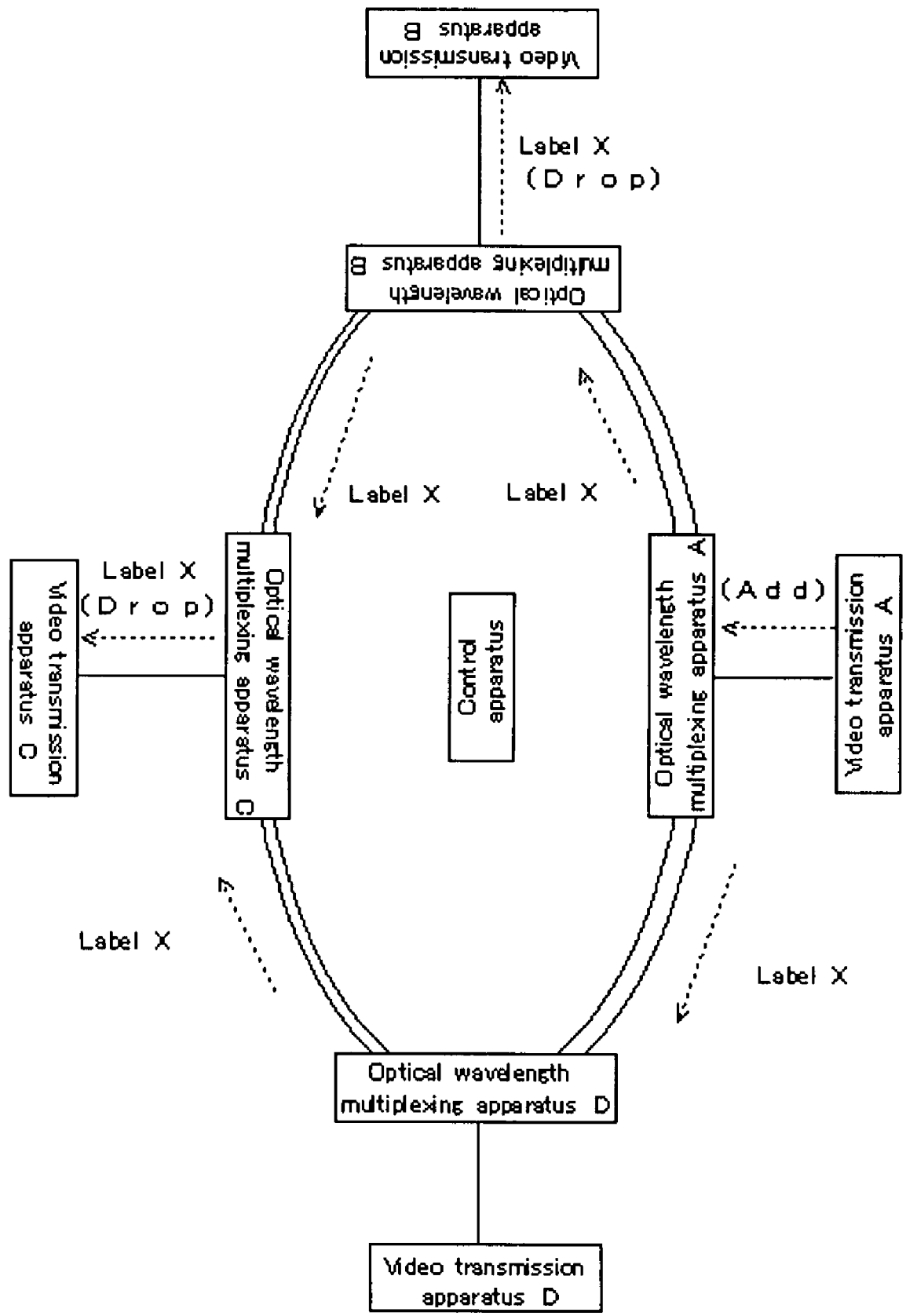
FIG. 6 is a functional block diagram of a first embodiment.

According to the control by the control apparatus, it is possible to carry out integrated control of the above-mentioned Drop and Add of any first video signal and of the second video signal. The description will be made with reference to FIG. 6. In the control apparatus, a configuration including port numbers of the respective apparatuses etc. is managed. Here, for the second video signal, inputted (Add) from a predetermined port of the video transmission apparatus A, label X is assigned (carrier is assigned). In this case, the control apparatus outputs a control instruction to assign the label X to the optical wavelength multiplexing apparatus A. Subsequently, the multiplexed signal including the signal, to which the label X has been assigned, is transmitted in the ring network. After that, for example, in order to carry out output (Drop) of the signal, to which the label X has been assigned, to the video transmission apparatuses B and C, an instruction signal is outputted to the optical wavelength multiplexing apparatuses B and C at an arbitrary timing so that the signal of the carrier is demultiplexed, and is outputted to the video transmission apparatus. This instruction signal may be transmitted to the respective optical wavelength multiplexing apparatuses via the ring redundant network, or via a network or special line using another optical line.

Thus, the instruction signal is outputted from the control apparatus to the optical wavelength multiplexing apparatus, so that in the video transmission apparatus adjacent to the optical wavelength multiplexing apparatus, it is possible to add (Add) the second video signal to be video source, or to transmit the first signal, outputted (Drop) from the optical wavelength multiplexing apparatus, to other external video transmission apparatus. Therefore, the video transmission apparatus just has to transmit the inputted/outputted video signal to the other external video transmission apparatus without a specified complex process.

Note that as to the above-mentioned label X, the label X may be assigned at a timing of switching of video source, or new label X may be assigned to the video source, which has been inputted as the second video signal, and is currently outputted to the network.

Note that generally, the optical wavelength multiplexing apparatus is an apparatus for demultiplexing and multiplexing of a signal in a state of optical signal. In the optical wavelength multiplexing apparatus of the second embodiment, the inputted optical signal is once converted to electrical signal, and after a predetermined process, may be converted to optical signal and may be outputted to the network as multiplexed signal. Generally, as a frame format in optical transmission network, there is a format called 'Wrapper'. For example, since 1 Wrapper in the optical wavelength multiplexing apparatus is 10 GB, it has been impossible to carry out Add/Drop of HD signal of 2.4 GB to the optical signal, and to include the video signal in the remaining capacity, about 7 GB. Meanwhile, by converting the optical signal to the electrical signal in the optical wavelength multiplexing apparatus, it is possible to include four video signals in 1 Wrapper, thereby enabling transmission of more video signals in the network. Therefore, in the optical wavelength multiplexing apparatus, it is possible to convert the demultiplexed optical signal of 1 Wrapper to the electrical signal, and to carry out Add/Drop based on header information such as the label added to the electrical signal.

Figure 7:
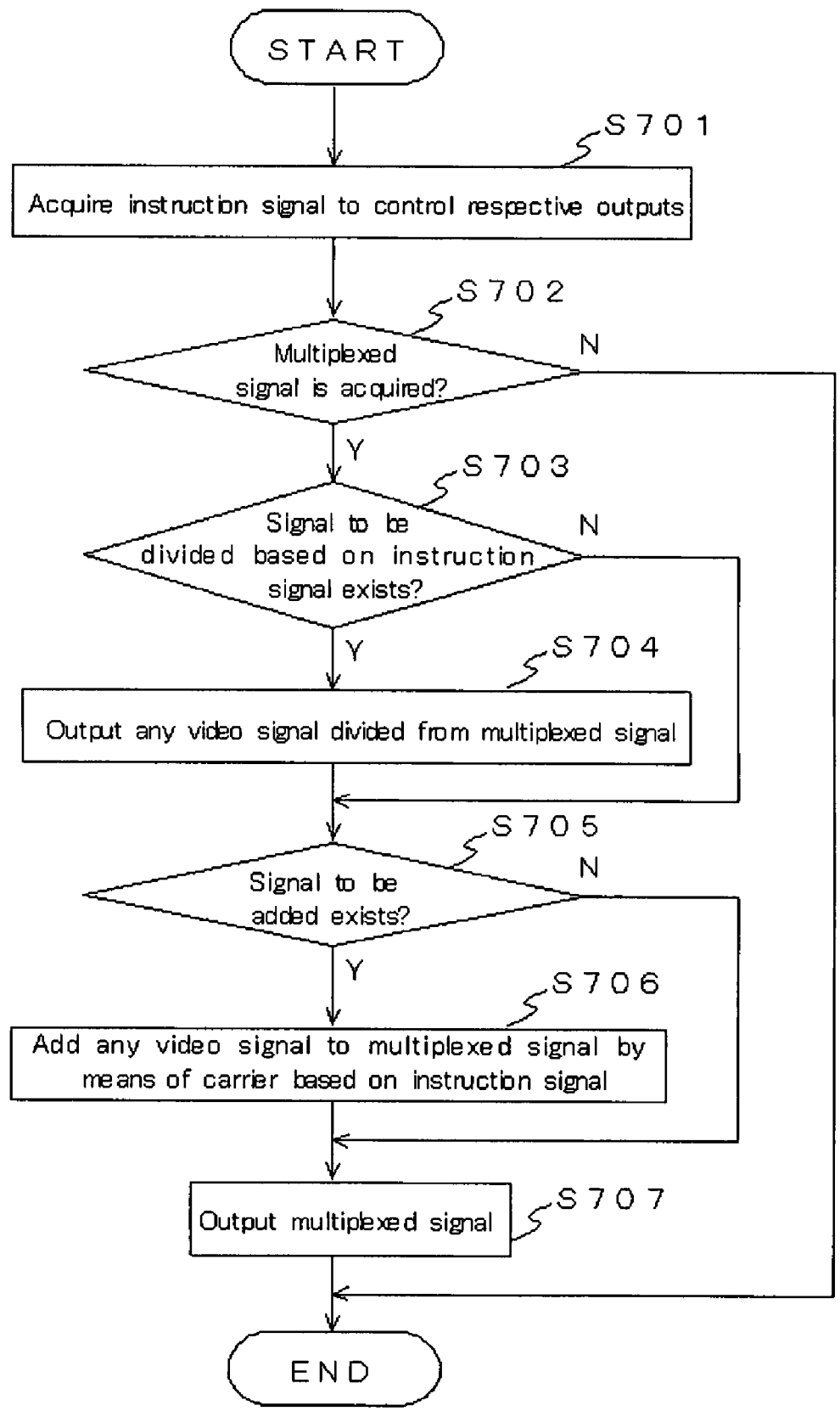
FIG. 7 is a flow chart of a second embodiment.

FIG. 7 is a flow chart of a second embodiment. In FIG. 7, at the outset, the instruction signal to control the respective outputs is acquired from the control unit (S701). Subsequently, in cases where the multiplexed signal is acquired, it is determined whether a signal to be demultiplexed based on the instruction signal, acquired by S701 (S702 and S703). If there is the signal to be added, any video signal is added to the multiplexed signal by means of the carrier in accordance with the instruction signal (S706). The other processes are the same as those of the first embodiment, so that descriptions have been omitted.

According to the second embodiment, the control apparatus for controlling output of signal is comprised, so that it is possible to carry out control of outputting any first video signal, and to carry out control upon outputting the second video signal as the multiplexed signal, thereby enabling easier switching of video source than that in the first embodiment. For example, it is possible to carry out all switches of video source at a predetermined time.

A third embodiment relates to the video transmission system of ring network, which carries out switching to signal from another transmission path configuring the redundant network, thereby enabling switching without instantaneous interruption in cases where failure occurs in one transmission path in the ring network (including a transmission path and a circuit of the optical multiplexing apparatus relating to the transmission path).

Figure 8:
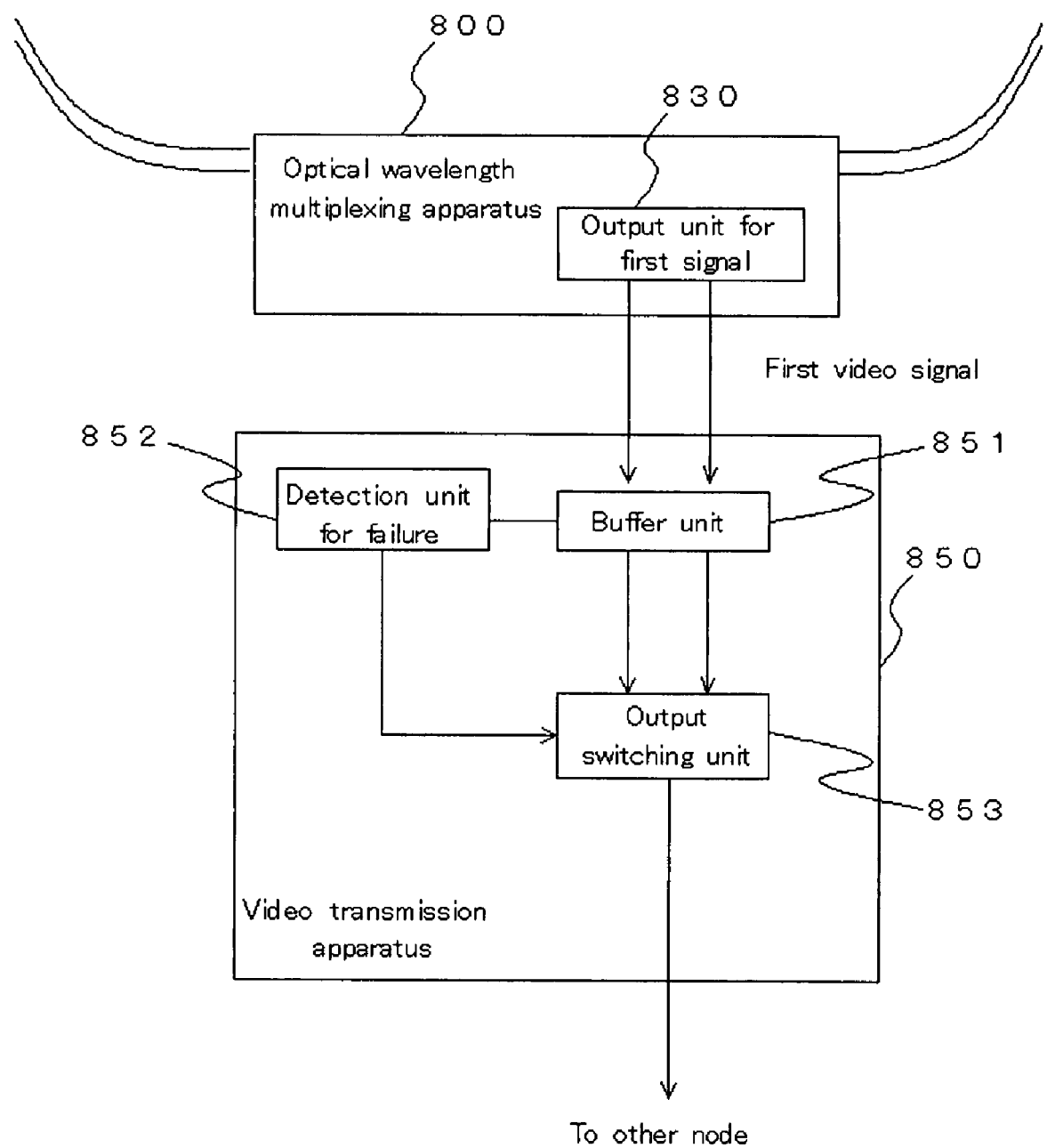
FIG. 8 is a functional block diagram of a third embodiment.

FIG. 8 is a functional block diagram of the third embodiment. FIG. 8 is a block diagram showing a configuration of the video transmission apparatus. As shown in FIG. 8, the video transmission apparatus 850 comprises, a 'buffer unit' 851, a 'detection unit for failure' 852, and a 'output switching unit' 853.

The 'buffer unit' 851 buffers the video signal, inputted from the respective redundant systems. The video signal corresponds to the above-mentioned first video signal (video signal inputted from the network to the video transmission apparatus). Note that a plurality of buffer units may be comprised corresponding to the respective systems. As to buffer size, it is preferable to provide enough buffer size for buffering of transmission delay in the network.

The 'detection unit for failure' 852 detects a failure in an active system of the systems. The active system is one of systems, to which the video signal is inputted from the optical multiplexing apparatus, and is operated for output of the video signal to the other external video apparatus by the video transmission apparatus. The detection of occurrence of failure may be carried out, for example, based on lack of video frame by checking its sequential number, or when correctable error threshold has been exceeded. Alternatively, the detection of failure may be carried out based on interruption of signal as a trigger due to the disconnection of optical fiber cable.

The 'output switching unit' 853 carries out switching of output in order to output the video signal to another external video apparatus by means of the video signal, which has been inputted from the other system and buffered, in cases where the failure is detected. The video signal corresponds to the first video signal. The 'other external video apparatus' corresponds to the video apparatus external from the network. In cases where the failure is detected by the detection unit for failure, the identical video signal, which has been inputted from the other system and buffered, is utilized, thereby enabling switching of the video signal without instantaneous interruption.

Hereinafter, a setting of switching in the third embodiment is described as no instantaneous-interruption mode. Further, as described in the second embodiment, the switching of video source, carried out at a predetermined time under control of the control apparatus, is described as the switching of schedule. Here, in cases where the switching of schedule is carried out in the no instantaneous-interruption mode, there is a possibility that the video transmission apparatus determines that video is interrupted instantaneously, and carries out detection of failure and switching of output. Therefore, in the case of carrying out the switching of schedule from the control apparatus as described in the second embodiment, for example, a signal for switching (e.g., packet for switching) is added to the immediately preceding portion of the video signal to be an object of switching from the optical multiplexing apparatus, and is outputted to the video transmission apparatus, so that the video transmission apparatus can determine that it is not a failure but a switching of video source, thereby suppressing unnecessary no instantaneous-interruption switching.

Figure 9:
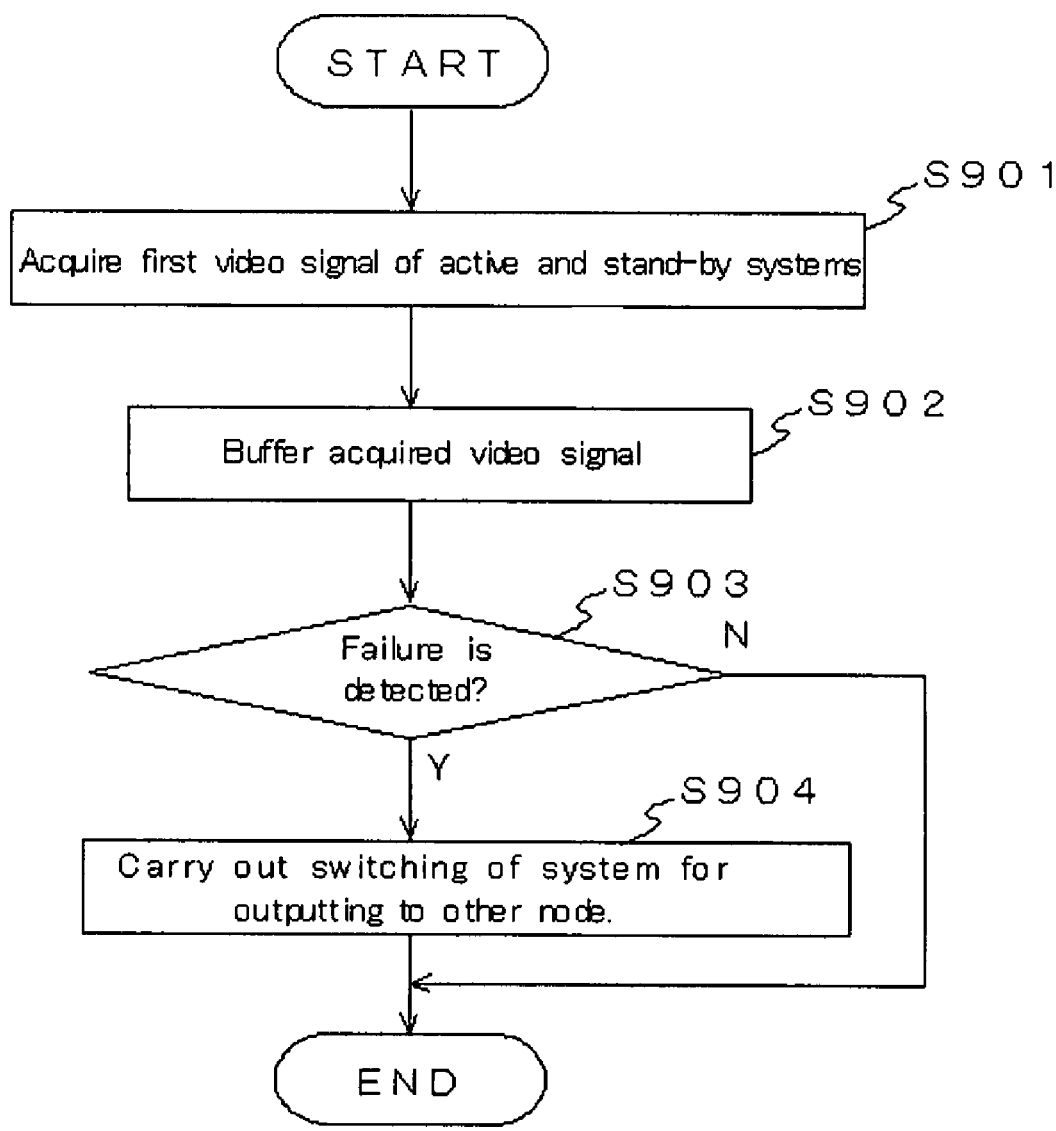
FIG. 9 is a flow chart of a third embodiment.
Figure 10:
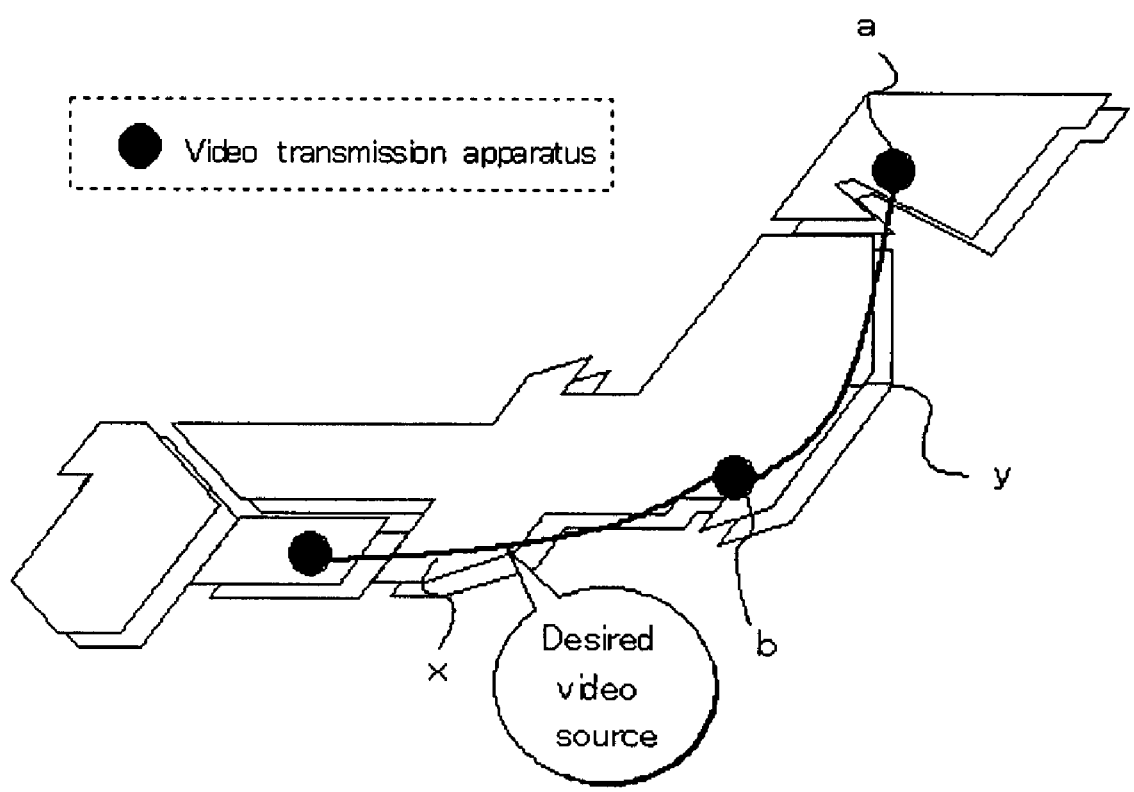
FIG. 10 is a diagram showing a conventional system.

FIG. 9 is a flow chart of a third embodiment. FIG. 9 is a flow chart showing a process in the video transmission apparatus. In FIG. 9, the redundant network is operated by two systems, the active and stand-by systems. At the outset, the first video signals of the active and stand-by systems are acquired (S901). Subsequently, the acquired video signals are buffered (S902). After that, in cases where failure is detected, switching of system for outputting to the other external video apparatus is carried out (S903 and S904). Note that although it is not indicated, output of the second video signal from the video transmission apparatus to the optical multiplexing apparatus may be carried out in a parallel manner to this.

According to the third embodiment, the buffer unit is comprised in the video transmission apparatus, which receives output of the redundant signal, and if failure is detected, switching to the video signal buffered in the buffer unit is carried out. Therefore, it is possible to utilize the signal, buffered in the buffer unit, as a backup of the delay portion of signal to be switched, thereby enabling switching of the video signal without instantaneous interruption.

What is claimed is:

1. The video transmission system of a ring network comprising:
   a ring redundant network, which is for carrying out optical wavelength multiplexing of at least one video signal, utilizable in the system, and transmission of a multiplexed signal;

an acquisition unit for the multiplexed signal, which acquires the multiplexed signal in said ring redundant network;

an output unit for a first signal, which is capable of outputting any first video signal, demultiplexed from the acquired multiplexed signal, to external from said ring redundant network;

an input receiving unit for a second signal, which receives an input of any second video signal, external from said ring redundant network, to be included in the multiplexed signal in said ring redundant network;

an output unit for the multiplexed signal, which is capable of multiplexing of said second video signal, which has been inputted, and of outputting the multiplexed signal to said ring redundant network, and a plurality of optical wavelength multiplexing apparatuses, and a plurality of video transmission apparatuses, adjacent to the respective optical wavelength multiplexing apparatuses, wherein the optical wavelength multiplexing apparatus comprises the acquisition unit for a multiplexed signal, the output unit for the first signal, the input receiving unit for the second signal, and the output unit for a multiplexed signal, the acquisition unit for a multiplexed signal comprises an acquisition means for a multiplexed signal, which acquires a multiplexed signal, outputted from another optical wavelength multiplexing apparatus, the output unit for the first signal comprises an output means for the first signal, which is capable of outputting said first video signal to the adjacent video transmission apparatus, which is exterior of the ring redundant network, the input receiving unit for the second signal comprises an input receiving means for the second signal, which receives an input of said second video signal from the adjacent video transmission apparatus, which is external from the ring redundant network, and the output unit for the multiplexed signal comprises an output means for the multiplexed signal, which is capable of multiplexing said second video signal, and of outputting the multiplexed signal to another optical wavelength multiplexing apparatus, different from the optical wavelength multiplexing apparatus, which has acquired said multiplexed signal.

2. The video transmission system of a ring network according to claim 1, wherein
   said output unit for the first signal and said output unit for the multiplexed signal carry out said respective outputs, in which the signal is identifiable on the basis of wavelength of the carrier, the system further comprising:
   a control apparatus, which carries out integrated control of said respective outputs on the basis of wavelength of the signal.

3. The video transmission system of a ring network according to claim 2, wherein the control apparatus carries out said control by means of GMPLS.

4. The video transmission system of a ring network according to claim 2, wherein
   said output unit for the first signal and said output unit for the multiplexed signal carry out said respective outputs, in which the signal is identifiable on the basis of wavelength of the carrier, the system further comprising:
   a control apparatus, which carries out integrated control of said respective outputs on the basis of wavelength of the signal.

5. The video transmission system of a ring network according to claim 4, wherein the control apparatus carries out said control by means of GMPLS.

6. The video transmission system of a ring network according to claim 1, wherein the video transmission apparatus comprises
  a buffer unit, which buffers said video signal, inputted from the respective redundant systems,
  a detection unit for failure, which detects a failure in an active system of said systems, and
  an output switching unit, which carries out switching of output in order to output said video signal to another external video apparatus by means of said video signal, which has been inputted from the other system and buffered, in cases where said failure is detected.

7. The video transmission method of a ring network, which includes a ring redundant network, which is for carrying out optical wavelength multiplexing of at least one video signal, utilizable in a system, and transmission of a multiplexed signal, the method comprising:
  an acquiring step for the multiplexed signal, which acquires the multiplexed signal in said ring redundant network;
  an outputting step for a first signal, which is capable of outputting any first video signal, demultiplexed from the acquired multiplexed signal, to external from said ring redundant network;
  an input receiving step for a second signal, which receives an input of any second video signal, external from said ring redundant network, to be included in the multiplexed signal in said ring redundant network; and
  an outputting step for the multiplexed signal, which is capable of multiplexing said second video signal, which has been inputted, and of outputting the multiplexed signal to said ring redundant network, further including a plurality of optical wavelength multiplexing apparatuses, and a plurality of video transmission apparatuses, adjacent to the respective optical wavelength multiplexing apparatuses, wherein
  the optical wavelength multiplexing apparatus is caused to execute the acquiring step for the multiplexed signal, the outputting step for said first signal, the input receiving step for said second signal, and the outputting step for a multiplexed signal,
  the acquiring step for a multiplexed signal comprises
    an acquiring step for the multiplexed signal, which acquires a multiplexed signal, outputted from another optical wavelength multiplexing apparatus,
  the outputting step for said first signal comprises
    an outputting step for said first signal, which is capable of outputting said first video signal to the adjacent video transmission apparatus, which is external from the ring redundant network,
  the input receiving step for said second signal comprises
    an input receiving step for said second signal, which receives an input of said second video signal from the adjacent video transmission apparatus, which is external from the ring redundant network, and
  the outputting step for the multiplexed signal comprises
    an outputting step for the multiplexed signal, which is capable of multiplexing said second video signal, and of outputting the multiplexed signal to another optical wavelength multiplexing apparatus, different from the optical wavelength multiplexing apparatus, which has acquired said multiplexed signal.

8. The video transmission system of a ring network according to claim 7, wherein
  said outputting step for said first signal and said outputting unit for the multiplexed signal carry out said respective outputting steps, in which the signal is identifiable on the basis of wavelength of the carrier, the method further comprising:
  a controlling step, which carries out integrated control of said respective outputs by a unit of wavelength of the signal.

9. The video transmission method of a ring network according to claim 8, wherein the controlling step carries out said control by means of GMPLS.

10. The video transmission system of a ring network according to claim 7, wherein
  said outputting step for said first signal and said outputting unit for the multiplexed signal carry out said respective outputting steps, in which the signal is identifiable on the basis of wavelength of the carrier, the method further comprising:
  a controlling step, which carries out integrated control of said respective outputs by a unit of wavelength of the signal.

11. The video transmission method of a ring network according to claim 10, wherein the controlling step carries out said control by means of GMPLS.

12. The video transmission method of a ring network according to claim 7, wherein the video transmission apparatus comprises
  a buffering step, which buffers said video signal, inputted from the respective redundant systems,
  a detecting step for failure, which detects a failure in an active system of said systems, and
  an output switching step, which carries out switching of output in order to output said video signal to another external video apparatus by means of said video signal, which has been inputted from the other system and buffered, in cases where said failure is detected.

* * * * *